United States Patent [19]

Pavolka

[11] 4,239,424
[45] Dec. 16, 1980

[54] METHOD AND APPARATUS FOR DISTRIBUTION OF GRANULAR MATERIAL IN A RAILWAY HOPPER CAR

[75] Inventor: John D. Pavolka, Michigan City, Ind.

[73] Assignee: Pullman Incorporated, Chicago, Ill.

[21] Appl. No.: 60,248

[22] Filed: Jul. 25, 1979

[51] Int. Cl.³ .............................................. B65G 53/40
[52] U.S. Cl. ...................................... 406/157; 414/397
[58] Field of Search ................ 406/157, 163; 414/293, 414/299, 397; 193/3, 29; 239/524; 141/286, 284

[56] References Cited

U.S. PATENT DOCUMENTS

| | | | |
|---|---|---|---|
| 1,068,006 | 7/1913 | Pottinger | 193/3 |
| 2,193,145 | 3/1940 | Schurz | 406/157 |
| 2,198,587 | 4/1940 | Skinner | 406/157 X |
| 3,868,028 | 2/1975 | Mausser | 406/157 X |

FOREIGN PATENT DOCUMENTS 1193432  5/1965  Fed. Rep. of Germany ........... 141/286

*Primary Examiner*—Jeffrey V. Nase
*Attorney, Agent, or Firm*—Richard J. Myers; Stephen D. Geimer

[57] ABSTRACT

A method and device for evenly distributing granular material such as plastic pellets into a railway hopper car to reduce the valley angle, eliminate void spaces, and increase the volume of material in each hopper. A cone-shaped deflector is placed in line with each hatch opening at a point below the roof line. The deflector directs material horizontally away from the hatch opening to reduce and virtually eliminate the valley angle for most granular materials. The cone is hung from support struts which may be suspended from an angular mounting ring which is mounted atop the hatch coaming.

4 Claims, 4 Drawing Figures

METHOD AND APPARATUS FOR DISTRIBUTION OF GRANULAR MATERIAL IN A RAILWAY HOPPER CAR

BACKGROUND OF THE INVENTION

1. Field of the Invention

This disclosure pertains to railway hopper cars and in particular to an implement used to evenly distribute granular material within the hoppers to reduce the valley angle of carried material and thus increase the capacity of each hopper.

2. Description of the Prior Art

Prior art devices which have sought to reduce valley angles and increase volumetric capacity have generally been directed to eliminating individual hatch openings and replacing each with so-called trough hatch openings which permit continuous feeding of the hopper and also reduce the valley angle of transported material. In the Prior Art there has been no known successful stationary device directed to reducing the valley angle and increasing hopper capacity for conventional round hatch openings. Slinging type devices that are mechanically driven are available for this purpose. These however are subject to frequent maintainence and are very expensive.

SUMMARY

This disclosure pertains to a method and an implement mounted within a conventional round hatch of a railway covered hopper car and provides a cone directly in line with the hatch opening to deflect all materials entering the hatch opening in a lateral, horizontal direction for evenly distributing the material within the hopper. The cone is suspended from struts which are mounted from an angular ring located at the top of the coaming of each hatch opening. With such a configuration, the deflector may be removed from the vehicle for clean-out, maintenance, and/or repair.

A loading line is attached to a collar or shield which covers the opening to prevent material from bouncing, or being deflected, outwardly, from the hopper car.

It is an object of this invention to provide a deflector for positioning immediately within the hatch openings of a covered hopper car and locating the cone below the roof line of the car to permit or require all material entering the hatch opening to contact the cone and be deflected laterally and generally horizontally for more complete and even distribution within the hopper.

It is another object of this disclosure to provide a cone-type deflector for positioning within a hopper and operating in conjunction with a loading line having a collar-type of shield, which closes off the top portion of the hatch opening to prevent randomly deflected pellets from being deflected out of the hopper.

It is another object of this invention to provide a cone-type deflector for location within a hopper and having a number of vertically extending struts attaching the cone to an annular, mounting ring which fits about the coaming of the associated hatch to permit the deflector unit to be easily removed and allow personnel to enter into hopper for clean out, maintenance, and the like.

These and other objects of the disclosure will become apparent to those having ordinary skill in the art with reference to the following description, drawings, and the claims.

DESCRIPTION OF THE PREFERRED EMBODIMENT

Figures 1, 2, 3, 4:
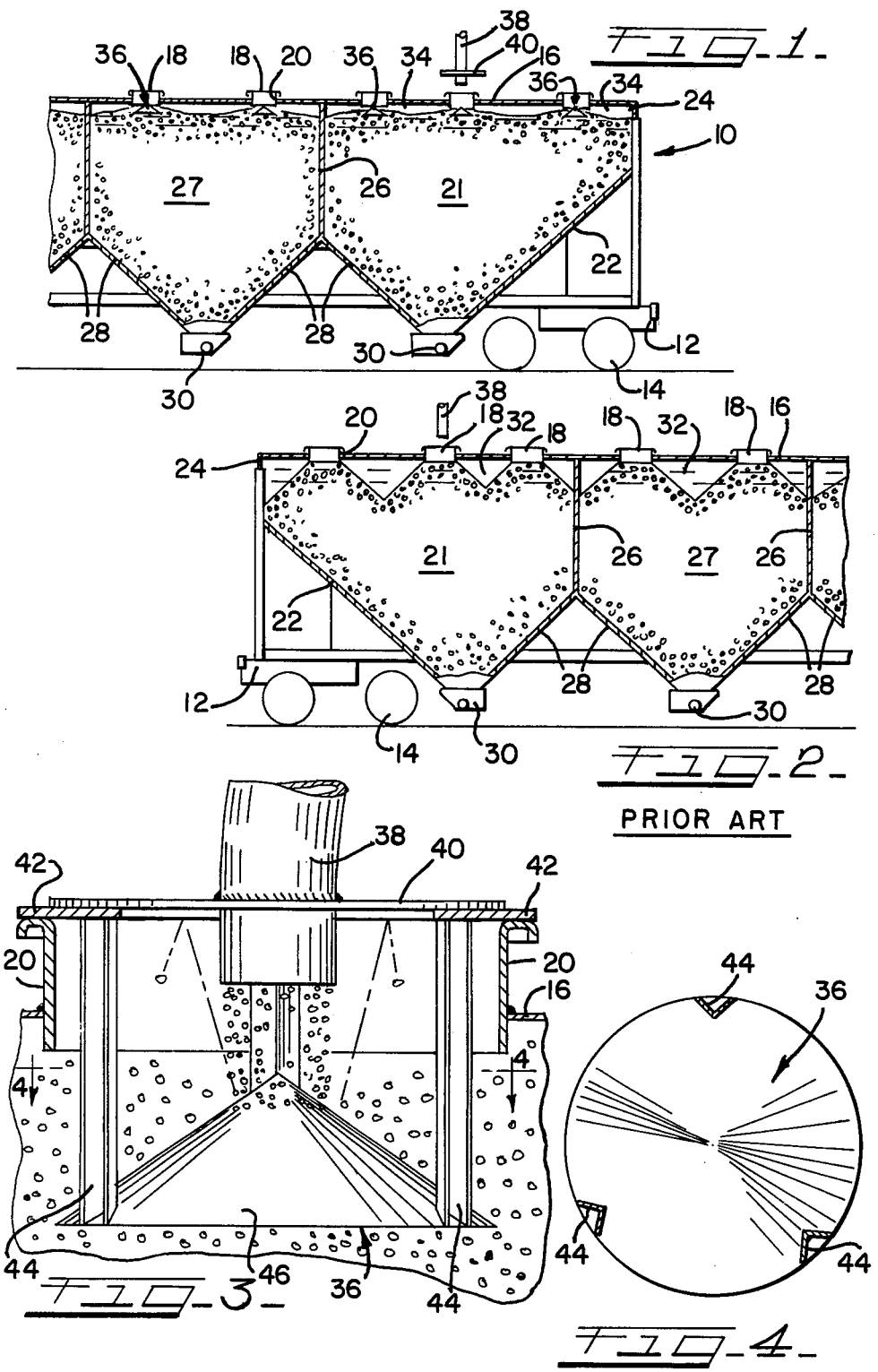
FIG. 1 is a partial longitudinal sectional view of a railway hopper car utilizing a distribution implement of this disclosure.
FIG. 2 is a partial longitudinal sectional view of a railway hopper car showing the prior art.
FIG. 3 is an enlarged view of the deflector and its associated supporting members.
FIG. 4 is a sectional view taken generally along the lines 4—4 of FIG. 3.

Referring now to the drawings, and in particular to FIG. 1, there is shown a portion of a railway hopper car 10 which may have a stub sill 12 and a supporting truck shown schematically and designated by the numeral 14. A roof extends from end to end and side to side of the hopper car 10 and includes a plurality of individual, circular hatch openings 18. Extending upwardly from each hatch opening 18, is coaming 20 (FIG. 3) which extends a short distance within the interior of the hopper and also extends upwardly and terminates with a rounded edge upon which a hatch cover with gasket (not shown) is seated securely to close off the top of the hatch opening.

The hopper car contains a number of hoppers including an end hopper 21 defined by an inclined, end slope sheet 22 and an upwardly extending end bulkhead 24 connecting the end slope sheet 22 with the roof 16. An intermediate bulkhead 26 provides a partition separating the end hopper 21 from intermediate hoppers 27. Slope sheets 28 extend downwardly from the intermediate bulkheads 26 and terminate at an outlet 30.

As shown in FIG. 2, after the lading is conventionally loaded in hopper cars, it generally assumes a hill-type position depending upon the nature of the granular or pulverulent material. Depending upon the type of material being transported, the so-called valley angle may vary and thus vary the volume of the void 32 between adjacent hatch openings 18. To eliminate or minimize the void caused by the inherent valley angle of granular lading, a deflector 36 is utilized to direct lading horizontally and thus reduce, if not virtually eliminate, the valley angle and increase the capacity of each hopper and reduce the void spaces to a minimal volume as designated 34 in FIG. 1.

As shown in FIGS. 3 and 4, the deflector unit is designated generally by the numeral 36 and is positioned in a hopper opening 18 directly in line with the feeder or loading line 38. Loading line 38 includes a connected collar or shield member 40 which is greater than the diameter of the hatch openings 18 and thus prevents material from bouncing upwardly from the deflector during loading. Collar 40 rests upon an annular mounting ring 42 which has a number of support struts 44 suspended therefrom and which extend into the hopper to position a deflector cone 46 below the level of the roof line and directly in line with the loading line 38. Mounting ring 42 provides a large opening to receive the loading hose line 38. The ring 42 also has an outer diameter larger than the hatch opening to prevent the deflector unit 36 from falling into a hopper. Struts 44 may be of any convenient configuration or cross section but it has been shown that angle iron may be easily cut to conform to the slope and contour of the cone 46 and also provide a lightweight structure having the required degree of strength.

The weight of the hose line 38 and deflector assembly 36 is sufficient to maintain the same in position during loading. When a respective hopper is filled both are removed to the next hatch opening to be filled. As shown in FIG. 3, the diameter of the cone 46 is smaller than the circular hatch openings 18, thereby facilitating insertion and removal of the deflector unit 36.

The present invention includes a modified embodiment wherein the mounting ring 42 of the deflector unit may be connected to the collar 38 and loading line by conventional means such as fasteners or welding etc., the ring 42 and the collar 40 forming a combination support shield, not shown. The entire assembly then could be moved from one hatch opening to the other.

OPERATION

In operation, it is noted that in FIG. 3 that because of the recommended 45 degree angle of the deflector cone 46, the lading which is initially propelled downwardly at a high velocity strikes the cone 46 and rebounds at a right angle from the angle of impact and thus rebounds horizontally at a high speed to allow the pellets to spread completely throughout the hopper at a full 360 degree angle.

Thus, from a method standpoint it is shown that the process of distributing granular material involves fitting the mounting ring 42 atop coaming 20, suspending deflector cone 46 therefrom at a point below the car roof, covering the hatch opening with the collar-shield 40 to prevent material from deflecting from the hopper, providing a moving airstream carrying granular material, and, impinging the airstream and material on the deflector cone 46 to direct the material throughout the hopper.

Cone 46 and its supporting struts 44 and other components of the assembly may be made from aluminum which can be used without the necessity of providing a protected coating which could chip off and contaminate the lading.

Thus, it has been shown with this disclosure that a simple, but yet effective method and device are provided for effectively spreading lading throughout a hopper to reduce the volume of void areas and thus increase the capacity and more fully utilize each hopper car. The deflector unit 36 is removably positioned in each hatch opening and supported on the coaming and with the hose may be moved from one hatch opening to the other to load the hoppers with granular materials.

The foregoing description and drawings merely explain and illustrate the invention and the invention is not limited thereto, except insofar as the appended claims are so limited, as those who are skilled in the art and have the disclosure before them will be able to make modifications and variations therein without departing from the scope of the invention.

What is claimed is:

1. A portable distribution device for evenly spreading granular material conveyed in a loading hose providing a moving airstream into a covered hopper car having a hatch opening in a roof and having upstanding coaming associated therewith, the improvement comprising:
   a deflector cone located below the roof and in alignment with said hatch opening;
   strut means connected with and extending upwardly from the deflector cone;
   strut mounting means removably positioned on said coaming, said strut means connected with said strut mounting means to support the deflector cone within said hopper car;
   a shield member extending across the hatch opening to prevent material from bouncing from the deflector cone and having opening means adapted to surround the loading hose, said shield member being connected to said loading hose and being positionable therewith, and
   said deflector cone having a diameter smaller than said hatch opening thereby facilitating insertion and removal of said distribution device.

2. The distribution device of claim 1 wherein said strut mounting means comprise:
   an annular ring;
   said annular ring having a central opening to receive the loading hose and having an outer diameter placing the outer periphery of the annular ring beyond said hatch coaming to support the distribution device within said hatch opening.

3. The distribution device of claim 1 wherein said strut means comprise:
   angle members having an L-shape and being spaced about the periphery of the deflector cone.

4. A portable distribution device for evenly spreading granular material in a loading hose into a covered hopper car having a hatch opening in a roof and having upstanding coaming associated therewith, the improvement comprising:
   a deflector cone located below the roof and in alignment with said hatch opening, said deflector cone having a diameter smaller than said hatch opening to facilitate insertion and removal of the distribution device,
   strut means connected with an extending upwardly from the deflector cone
   support shield means removably positioned on said coaming, said strut means connected with said support shield means to support the deflector cone within said hopper,
   said support shield means extending across the hatch opening to prevent material from bouncing from the deflector cone and having opening means adapted to surround said loading hose, and
   said support shield being connected to said loading hose, said distribution device thereby being positionable with said loading hose.

* * * * *